(12) United States Patent
Soukup et al.

(10) Patent No.: US 12,218,390 B2
(45) Date of Patent: Feb. 4, 2025

(54) METHOD FOR HEATING A FUEL CELL SYSTEM AND FUEL CELL SYSTEM

(71) Applicant: AVL List GmbH, Graz (AT)

(72) Inventors: Nikolaus Soukup, Hamburg (DE); Martin Hauth, Graz (AT); Michael Seidl, Graz (AT); Stefan Weissensteiner, Graz (AT)

(73) Assignee: AVL List GmbH, Graz (AT)

( * ) Notice: Subject to any disclaimer, the term of this patent is extended or adjusted under 35 U.S.C. 154(b) by 103 days.

(21) Appl. No.: 17/295,061

(22) PCT Filed: Nov. 19, 2019

(86) PCT No.: PCT/AT2019/060391
§ 371 (c)(1),
(2) Date: May 19, 2021

(87) PCT Pub. No.: WO2020/102837
PCT Pub. Date: May 28, 2020

(65) Prior Publication Data
US 2022/0085392 A1    Mar. 17, 2022

(30) Foreign Application Priority Data
Nov. 19, 2018   (AT) .............................. A 51008/2018

(51) Int. Cl.
*H01M 8/04223* (2016.01)
*H01M 8/04014* (2016.01)
(Continued)

(52) U.S. Cl.
CPC ... *H01M 8/04268* (2013.01); *H01M 8/04022* (2013.01); *H01M 8/04097* (2013.01);
(Continued)

(58) Field of Classification Search
None
See application file for complete search history.

(56) References Cited

U.S. PATENT DOCUMENTS

| 2004/0058230 A1* | 3/2004 | Hsu | H01M 8/04231 |
| | | | 429/62 |
| 2011/0206562 A1 | 8/2011 | Maenishi et al. | |

(Continued)

FOREIGN PATENT DOCUMENTS

| CN | 101808935 | 8/2010 |
| DE | 102007018264 | 10/2008 |

(Continued)

OTHER PUBLICATIONS

Internationaler Recherchenbericht und Schriftlicher Bescheid [International Search Report and the Written Opinion] Dated Jan. 22, 2020 From the International Searching Authority Re. Application No. PCT/AT2019/060391 and Its Translation of Search Report Into English. (13 Pages).

*Primary Examiner* — Lucas J. O'Donnell

(57) ABSTRACT

The present invention relates to a method for heating a fuel cell system (1a; 1b; 1c; 1d) comprising at least one fuel cell stack (2) with an anode portion (3) and a cathode portion (4), and a reformer (5) upstream of the anode portion (3) for steam reforming using a fuel, the reformer (5) comprising a nickel-based catalyst, said method having the following steps: starting a heating process for heating the fuel cell system (1a; 1b; 1c; 1d) with a heating device (6) and conducting a carbon-containing fluid and conducting steam through the nickel-based catalyst of the reformer (5) during the heating process. The invention also relates to a fuel cell system (1a; 1b; 1c; 1d) which is designed to carry out a method according to the invention.

6 Claims, 3 Drawing Sheets

(51) Int. Cl.
  *H01M 8/04089*   (2016.01)
  *H01M 8/0432*    (2016.01)
  *H01M 8/04746*   (2016.01)
  *H01M 8/0612*    (2016.01)
  *H01M 8/12*          (2016.01)

(52) U.S. Cl.
  CPC ... *H01M 8/04373* (2013.01); *H01M 8/04776* (2013.01); *H01M 8/0618* (2013.01); *H01M 8/0625* (2013.01); *H01M 2008/1293* (2013.01); *H01M 2250/10* (2013.01)

(56) References Cited

U.S. PATENT DOCUMENTS

| | | | |
|---|---|---|---|
| 2012/0064422 | A1 | 3/2012 | Takeuchi et al. |
| 2015/0086887 | A1 | 3/2015 | Matsuo et al. |
| 2017/0062853 | A1* | 3/2017 | Kakuwa ................ B01J 8/0285 |

FOREIGN PATENT DOCUMENTS

| | | |
|---|---|---|
| EP | 2199255 | 6/2010 |
| JP | 2009-022234 | 2/2009 |
| JP | 2009-059668 | 3/2009 |
| JP | 2011-081972 | 4/2011 |
| JP | 2019-169256 | 10/2019 |
| WO | WO 2011/012942 | 2/2011 |
| WO | WO 2020/102837 | 5/2020 |

\* cited by examiner

METHOD FOR HEATING A FUEL CELL SYSTEM AND FUEL CELL SYSTEM

RELATED APPLICATIONS

This application is a National Phase of PCT Patent Application No. PCT/AT2019/060391 having International filing date of Nov. 19, 2019, which claims the benefit of priority of Austrian Patent Application No. A51008/2018 filed on Nov. 19, 2018. The contents of the above applications are all incorporated by reference as if fully set forth herein in their entirety.

FIELD AND BACKGROUND OF THE INVENTION

The present invention relates to a method for heating a fuel cell system, in particular an SOFC system, and an associated fuel cell system.

Before an SOFC system can be operated at full power, it must be brought to operating temperature. This takes place during the course of a heating-up or start-up operation of the SOFC system. Known SOFC systems have at least one fuel cell stack with an anode portion and a cathode portion as well as a reformer upstream of the at least one fuel cell stack. It is also known for the reformer to be equipped with a nickel-based catalyst for steam reforming or for the reformer to be designed in the form of a nickel reformer. In order to prevent the nickel from oxidising during the heating-up operation, the nickel-based catalyst of known systems is flowed around with a purge gas or protective gas, for example in the form of a carbon-containing gas. In other words, a correspondingly reducing environment is created around the nickel-based catalyst during the heating-up operation. In order to avoid carbon deposits, oxygen-containing gas can in addition be added to the carbon-containing gas. This allows the carbon of the carbon-containing gas to be oxidised and transported out of the reformer in the form of carbon dioxide. In other words, by feeding in an oxygen-containing gas during the heating-up operation, carbon of the carbon-containing gas can be bound. Carbon deposits can, accordingly, be avoided.

However, it has been found that, where nickel-based catalysts are used, additional measures are necessary in order to keep nickel reduced during the heating-up operation and to prevent it from oxidising.

SUMMARY OF THE INVENTION

The object of the present invention is to take into account at least partially the problem described above. In particular, it is the object of the present invention to provide a method for heating up a fuel cell system with nickel-based catalyst in the reformer wherein, during a heating-up operation of the fuel cell system, nickel in the system remains reduced in a simple way and does not oxidise. A further object is to provide a correspondingly configured fuel cell system for carrying out such a method.

The above object is achieved through the claims. In particular, the above object is achieved through the method according to the present invention as well as the fuel cell system according to the present invention. Further advantages of the invention arise from the dependent claims, the description and the drawings. Naturally, features and details which are described in connection with the method also apply in connection with the fuel cell system according to the invention and vice versa, so that with regard to the disclosure, mutual reference can always be made to the individual aspects of the invention.

According to a first aspect of the present invention, a method is provided for heating a fuel cell system comprising at least one fuel cell stack with an anode portion and a cathode portion as well as a reformer upstream of the anode portion for steam reforming using a fuel, the reformer comprising a nickel-based catalyst. The method has the following steps:

starting a heating process for heating the fuel cell system with a heating device and conducting a carbon-containing fluid as well as conducting steam through the nickel-based catalyst of the reformer during the heating process.

Oxygen is fed to the nickel-based catalyst during the heating process through the steam. However, in contrast to the methods known in the prior art, the oxygen in the steam is provided in chemically bound form. This prevents the oxygen from immediately bonding with reduced nickel.

In connection with the present invention, it was found that the oxygen bound in the steam is, like unbound oxygen, suitable for binding carbon which is produced and avoiding corresponding deposits, and the remaining hydrogen ensures that nickel remains reduced and does not oxidise. To avoid carbon deposits, the steam is supplied in a predefined steam/carbon ratio, whereby the water content can be chosen so as to be slightly higher than for an equilibrium state in order to provide a certain degree of certainty.

The present invention preferably relates to a method for heating an SOFC system, in particular a stationary SOFC system. The method is preferably operated with a nickel-based catalyst with approx. 30-70, preferably approx. 50 percent by weight nickel. In other words, the nickel-based catalyst is a catalyst which has a corresponding nickel content.

The heating process can be understood as a process for heating up the fuel cell system, especially during the course of a start-up process of the fuel cell system. The heating process is preferably carried out until the reformer is heated to a predefinable operating temperature, for example within a range between 400° C. and 600° C., in particular within a range between 500° C. and 550° C.

From a temperature of approx. 50° C., nickel would be oxidised in the reformer in the presence of oxygen. This is not desirable. The oxidised nickel would have to be reduced again during the operation of the fuel cell system in order for a steam reforming to lead to an equilibrium composition. In other words, the entire catalyst would have to be reduced again. This can take a long time and the structure of the catalyst can thereby be damaged. In order to keep the nickel oxidation at a minimum, reversible level, according to the invention the carbon-containing fluid is applied to the reformer or the nickel-based catalyst of the reformer, as a result of which oxygen around the catalyst can be displaced.

The fuel is in particular a hydrocarbon-containing fuel. The heating device can comprise a plurality of heating means at different points in the fuel cell system.

The carbon-containing fluid and steam are conducted through the nickel-based catalyst of the reformer by means of a fluid delivery device. The fluid delivery device can comprise a pump and/or a blower for delivering or conducting a liquid and/or gaseous fluid.

According to a further embodiment of the present invention, a method is possible in which the steam is conducted through the nickel-based catalyst from a predefinable threshold temperature in the fuel cell system. The threshold temperature is preferably predefined depending on the environment of the fuel cell system or environmental parameters and/or operating states of the fuel cell system. The aim is that the steam should as far as possible remain gaseous in order to avoid water deposits. At ambient pressure and also under otherwise inconspicuous environmental conditions and/or operating states, the threshold temperature can accordingly be set to a value of at least 100° C. Preferably, the threshold temperature is predefined at a value between approx. 100° C. and approx. 110° C. In order to be able to make use of the advantageous effect of the steam as early as possible or for a long time, the temperature should not be selected too high. In experiments in connection with the present invention it has been shown that slight water deposits can be tolerated since the fuel cell system can evaporate locally during the heating process without causing damage.

Furthermore, it is possible that in a method according to the invention the fuel, in particular methane, natural gas or LPG, is used as carbon-containing fluid. In other words, the same fuel is used as in later normal operation of the fuel cell system, i.e. in an operating mode in which electricity is generated by means of the fuel cell system. Using the same fuel for start-up operation as well as normal operation means that the fuel cell system can be operated efficiently. Separate and/or additional fuel storage and/or fuel sources can be dispensed with. In order to avoid an evaporation step, preferably only gaseous fuel is used.

In a further variant embodiment of the present invention, it is possible that the fuel is used as carbon-containing fluid during the heating process in a fuel quantity of between 5% and 20% of the fuel quantity used during steam reforming in normal operation of the fuel cell system. In other words, the amount of fuel used is kept relatively low compared to normal operation. This can prevent the at least one fuel cell stack downstream of the reformer from being cooled through the endothermic reforming, slowing down the heating process accordingly.

In addition, in a method according to the present invention the heating device can have a heat exchanger on the reformer as well as an afterburner for combusting cathode exhaust gas and/or anode exhaust gas from the at least one fuel cell stack, wherein afterburner exhaust gas is fed to a hot side of the heat exchanger downstream of the afterburner in order to heat up the reformer during the heating process. The reformer can be heated particularly efficiently using the afterburner exhaust gas. The afterburner is arranged downstream of the at least one fuel cell stack and is in fluid communication with a fluid output of the anode portion and a fluid output of the cathode portion, respectively.

In a method according to the invention it is moreover possible that the steam and the carbon-containing fluid in the form of fuel are conducted to the reformer, as a fuel/steam mixture, via an anode gas supply line upstream of the reformer. In other words, the steam and the fuel, as a fuel-steam mixture, are provided upstream of the reformer, in particular upstream of a fluid delivery device, likewise arranged upstream of the reformer, and conducted from there through the anode gas supply line in the direction of the reformer. As a result, a particularly space-saving and weight-reduced process fluid line system can be provided for the fuel cell system. The anode gas supply line is understood to be a fluid line through which, in normal operation of the fuel cell system, fuel or a fuel mixture which is to be reformed is conducted to the reformer. The anode gas supply line is arranged upstream of the optional fluid delivery device, downstream of the fluid delivery device and, accordingly, upstream of the reformer.

According to a further variant embodiment of the present invention, in one method a fluid delivery device for delivering the fuel to the reformer, as described above, can be arranged upstream of the reformer in the anode gas supply line and a steam supply line for feeding steam into the anode gas supply line can be arranged next to the anode gas supply line, whereby the steam is, during the heating process, conducted through the steam supply line and fed into the anode gas supply line downstream of the fluid delivery device and mixed with the fuel. Due to the fact that the steam is only fed into the anode gas supply line downstream of the fluid delivery device, via the separate steam supply line, the fluid delivery device only needs to be designed to transport or deliver the preferably gaseous fuel, as a result of which costs can be saved at this point. In order to deliver the steam, a suitable further fluid delivery device can be provided in the steam supply line. The further fluid delivery device only needs to be activated during the start-up operation or heating process, as a result of which, with respect to the service life of the fuel cell system, a relatively long durability of the further fluid delivery device can be achieved.

In addition, in a method according to the present invention it is possible that a fluid delivery device for delivering the fuel to the reformer is arranged upstream of the reformer in the anode gas supply line, and a steam supply line for feeding steam into the anode gas supply line is arranged next to the anode gas supply line, whereby the steam is, during the heating process, conducted through the steam supply line and fed into the anode gas supply line upstream of the fluid delivery device and mixed with the fuel. By feeding the steam into the anode gas supply line upstream of the fluid delivery device, in particular directly upstream of the fluid delivery device, advantages in terms of flow dynamics can be achieved with a simple and compact construction design of the fuel cell system.

Furthermore, in a method according to the invention a fluid delivery device for delivering the fuel to the reformer can be arranged upstream of the reformer in the anode gas supply line and a steam supply line for feeding steam into the anode gas supply line can be arranged next to the anode gas supply line, whereby a hot side of an exhaust gas heat exchanger is arranged in the steam supply line and the steam is, during the heating process, conducted through the steam supply line and the hot side of the exhaust gas heat exchanger, fed into the anode gas supply line downstream or upstream of the fluid delivery device and mixed with the fuel. This allows the steam to be preheated in an efficient way during the heating process. The exhaust gas heat exchanger, or the hot side of the exhaust gas heat exchanger, can be provided downstream of a hot side of a reformer heat exchanger or the heat exchanger on the reformer. The exhaust gas heat exchanger can also be provided downstream of a hot side of a cathode gas heat exchanger which is arranged downstream of the afterburner, in particular in a cathode gas supply line. In other words, the exhaust gas heat exchanger is a heat exchanger which is in any case used or required in the fuel cell system.

According to a further aspect of the present invention, a fuel cell system is also provided which is configured to carry out a method as described above. The fuel cell system comprises at least one fuel cell stack with an anode portion and a cathode portion as well as a reformer upstream of the anode portion for steam reforming a fuel, the reformer comprising a nickel-based catalyst.

Thus, a fuel cell system according to the invention brings with it the same advantages as have been described in detail with reference to the method according to the invention. As already described above, the heating device can have a heat exchanger on the reformer as well as an afterburner for combusting cathode exhaust gas and/or anode exhaust gas from the at least one fuel cell stack. A fluid delivery device for delivering the fuel to the reformer can be arranged in the anode gas supply line upstream of the reformer. A steam supply line for feeding steam into the anode gas supply line can be arranged next to the anode gas supply line. A hot side of an exhaust gas heat exchanger can be arranged in the steam supply line, wherein the exhaust gas heat exchanger can be provided downstream of a hot side of a cathode gas heat exchanger which is arranged downstream of the afterburner, in particular in a cathode gas supply line.

BRIEF DESCRIPTION OF THE SEVERAL VIEWS OF THE DRAWINGS

Further measures improving the invention are explained in the following description of different exemplary embodiments of the invention, which are represented schematically in the figures. All features and/or advantages deriving from the claims, the description or the figures, including constructive details and spatial arrangements, can be essential to the invention, both in themselves and in the different combinations.

In Each Case Schematically.

DESCRIPTION OF SPECIFIC EMBODIMENTS OF THE INVENTION

Elements with the same function and mode of action are given the same reference signs in FIGS. 1 to 4.

Figure 1:
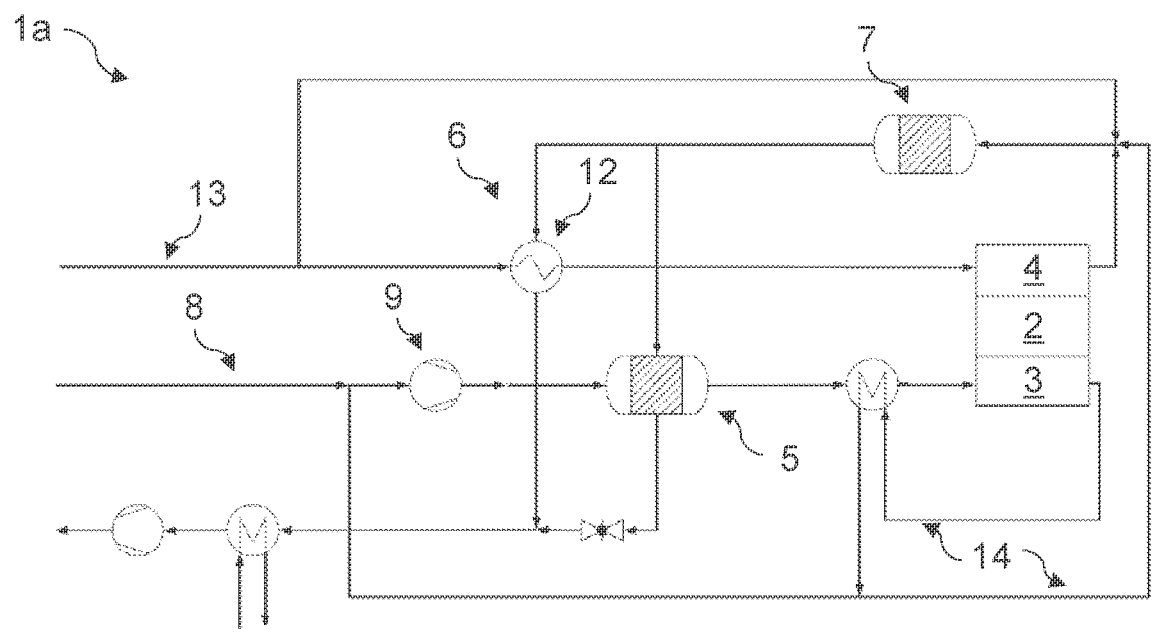
FIG. 1 shows a block diagram explaining a fuel cell system according to a first embodiment of the present invention.

A fuel cell system 1a according to a first embodiment is shown schematically in FIG. 1. The fuel cell system 1a comprises a fuel cell stack 2 with an anode portion 3 and a cathode portion 4 as well as a reformer 5 upstream of the anode portion 3 for steam reforming a fuel. The reformer 5 comprises a nickel-based catalyst. A heating device 6 is provided to control the temperature of the fuel cell system 1a. The heating device 6 comprises a heat exchanger on the reformer 5, an afterburner 7 for combusting cathode exhaust gas and/or anode exhaust gas from the fuel cell stack 2 as well as a cathode gas heat exchanger 12 in a cathode gas supply line 13. In addition, the heating device 6 can be assigned further heating elements and functional components, which are not however described further here.

The cathode gas supply line 12 is provided in order to feed cathode supply gas to the cathode portion 4. Cathode supply gas can in particular be understood to be air or another oxygen-containing fluid. An anode gas supply line 8 is arranged upstream of the anode portion 3. Anode gas or a process fluid for the anode portion can be conducted through the anode gas supply line in the direction of the reformer and/or the anode portion. In other words, not only gas, but also another process fluid for the anode portion can be conducted through the anode gas supply line.

The afterburner 7 is arranged downstream of the fuel cell stack 2 and upstream of a hot side of the cathode heat exchanger 12. A fluid delivery device 9 for delivering the fuel to the reformer 5 is arranged in the anode gas supply line 8 upstream of the reformer 5. The fuel cell system 1a also has a recirculation path 14 through which fuel cell exhaust gas, in particular anode exhaust gas from the anode portion 3, can be recycled downstream of the fuel cell stack 2 or fed back into the anode portion.

Figure 2:
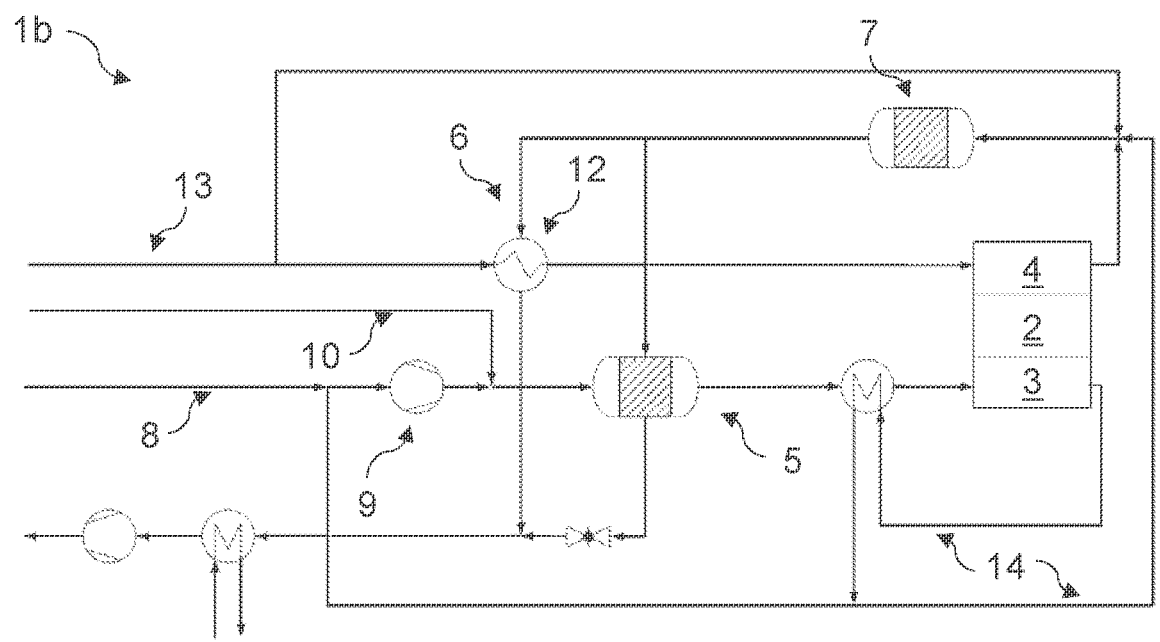
FIG. 2 shows a block diagram explaining a fuel cell system according to a second embodiment of the present invention.

FIG. 2 shows a fuel cell system 1b according to a second embodiment. The fuel cell system 1b shown in FIG. 2 corresponds substantially to the fuel cell system 1a shown in FIG. 1, wherein a steam supply line 10 for feeding steam into the anode gas supply line 8 downstream of the fluid delivery device 9 is arranged next to the anode gas supply line 8.

Figure 3:
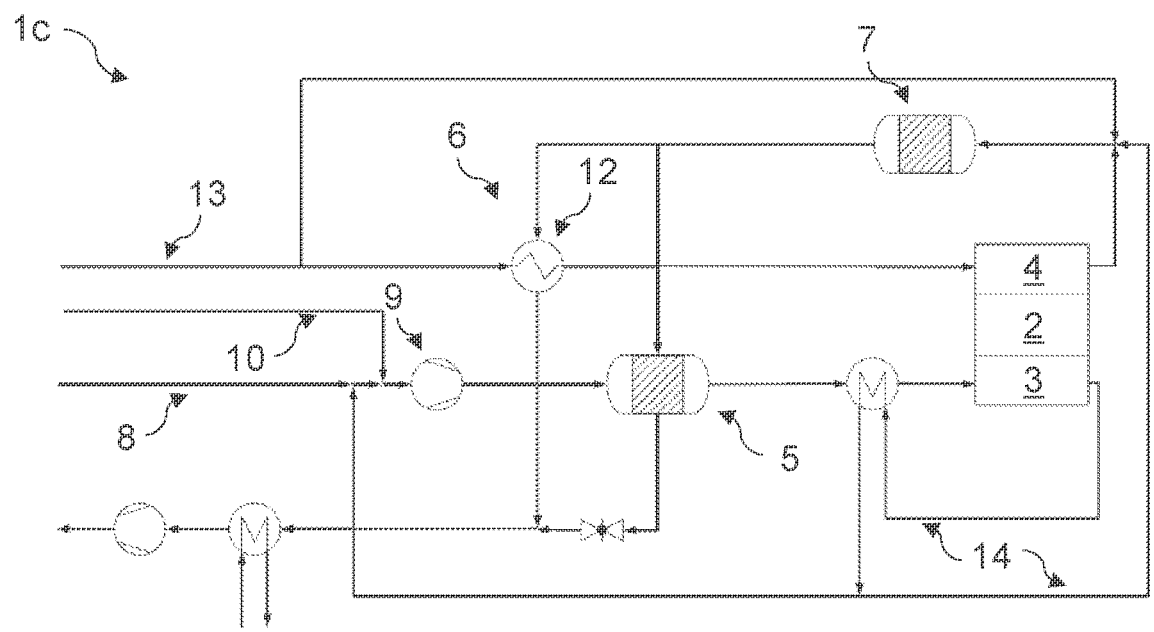
FIG. 3 shows a block diagram explaining a fuel cell system according to a third embodiment of the present invention.

FIG. 3 shows a fuel cell system 1c according to a third embodiment. The fuel cell system 1b [1]shown in FIG. 3 corresponds substantially to the fuel cell system 1a shown in FIG. 1, wherein a steam supply line 10 for feeding steam into the anode gas supply line 8 upstream of the fluid delivery device 9 is arranged next to the anode gas supply line 8.

[1]Should presumably be 1c

Figure 4:
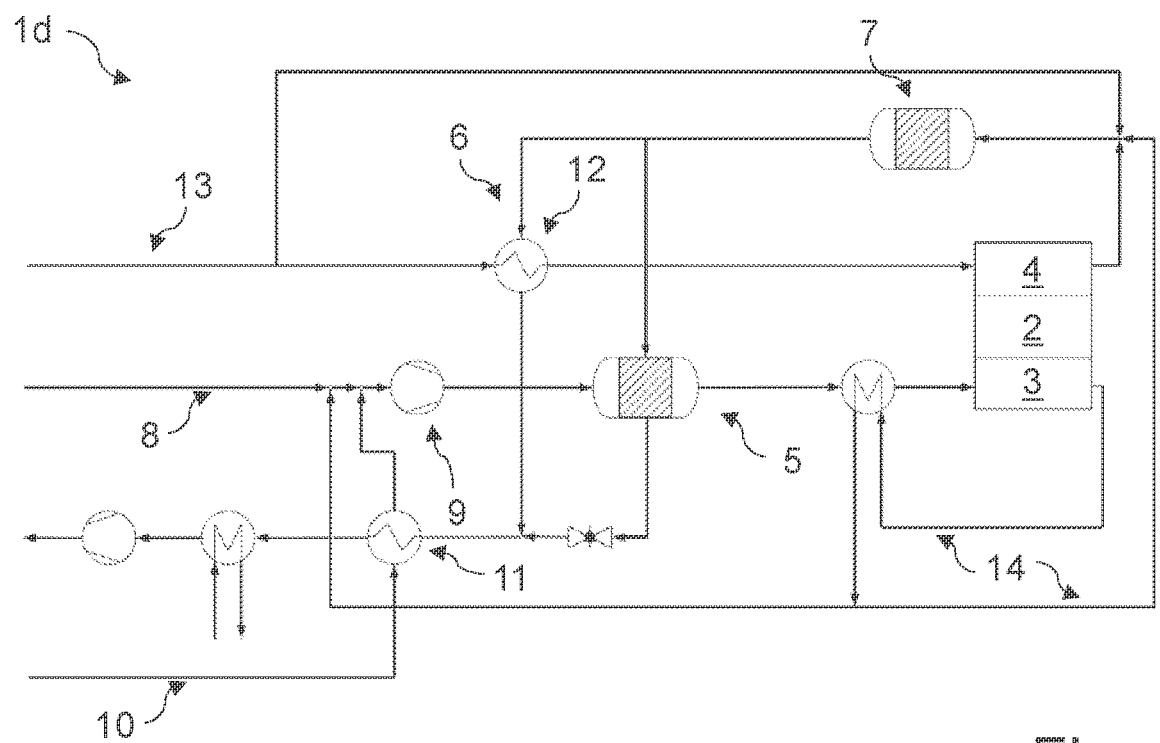
FIG. 4 shows a block diagram explaining a fuel cell system according to a fourth embodiment of the present invention and FIG. 5 shows a curve diagram explaining a method for heating a fuel cell system according to the invention.

FIG. 4 shows a fuel cell system 1d according to a fourth embodiment. The fuel cell system 1b [2]shown in FIG. 4 corresponds substantially to the fuel cell system 1a shown in FIG. 1, wherein a steam supply line 10 for feeding steam into the anode gas supply line 8 is arranged next to the anode gas supply line 8 and a hot side of an exhaust gas heat exchanger 11 is arranged in the steam supply line 10. This makes it possible, during the heating process, for the steam to be conducted through the steam supply line 10 and the hot side of the exhaust gas heat exchanger 11, then fed into the anode gas supply line 8 and mixed with the fuel.

[2]Should presumably be 1d

Figure 5:
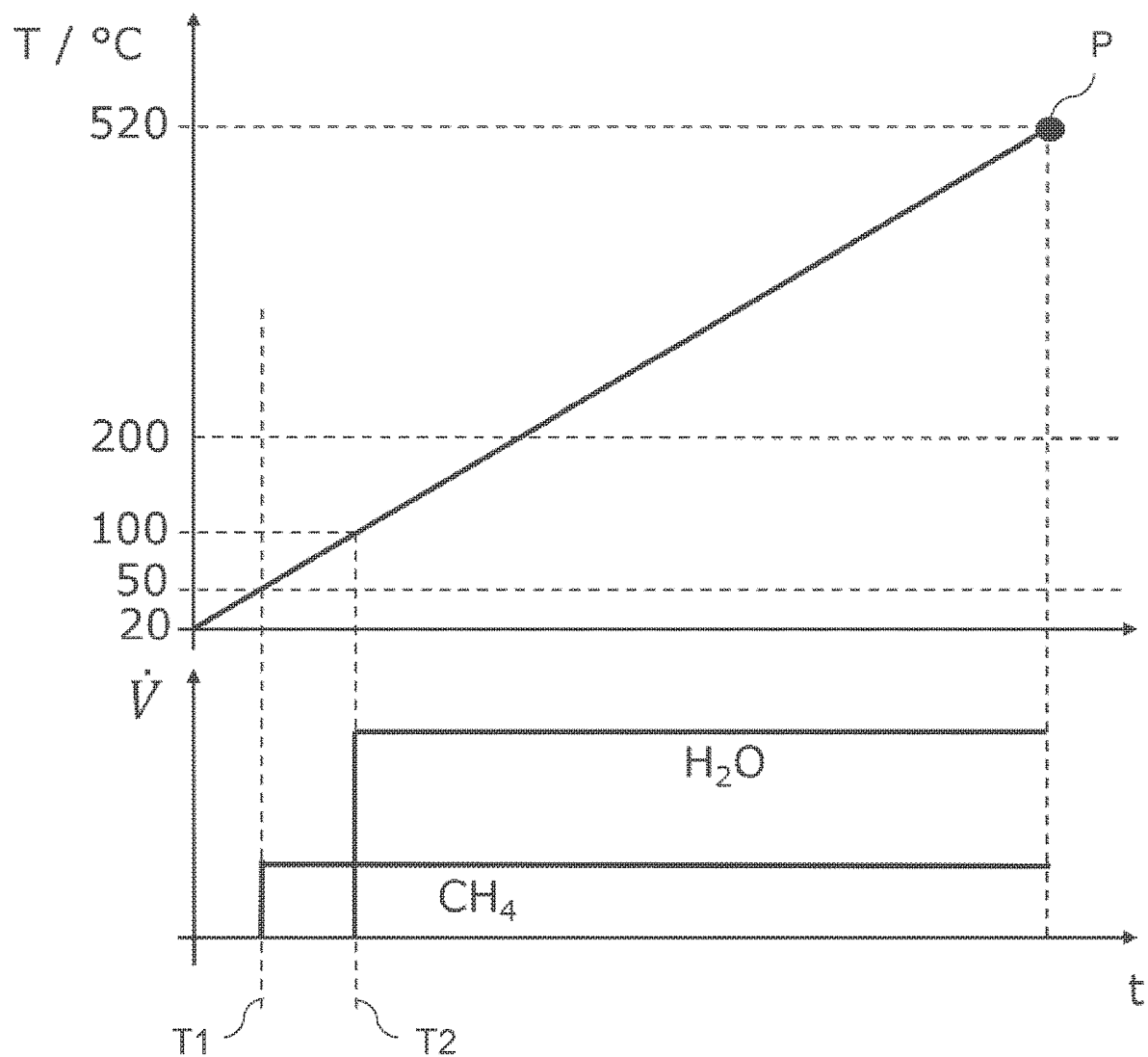

A method for heating up a fuel cell system 1d as shown in FIG. 4 according to a preferred embodiment is now described with reference to FIG. 5. For this purpose, the heating process for heating up the fuel cell system 1d is first initiated by means of the heating device 6. From a temperature T1 of approx. 50° C., associated with a time Z1, methane is fed to the reformer 5 through the anode gas supply line 8 in a fuel quantity of approx. 10% of the fuel quantity used during steam reforming in normal operation of the fuel cell system 1d. As soon as a threshold temperature T2 of over 100° C. is reached in the fuel cell system, at a time Z2, steam is fed to the reformer 5 or the nickel-based catalyst located therein via the steam supply line 10, the hot side of the exhaust gas heat exchanger 11 and then the anode gas supply line 8. At 200° C., a carbon formation and a corresponding deposit could begin, which is however prevented by the supply of the steam. As soon as the fuel cell system 1d has reached an operating point P, at which a temperature of approx. 520° C. has been reached, the heating-up operation is terminated.

If no more power is to be generated through the fuel cell system 1d, the fuel cell system 1d is shut down. For this purpose, the electrical consumer (not shown) of the fuel cell system 1d is switched off, as a result of which the current drops close to zero. The fuel cell system 1d is then cooled with air. The fuel supply can for example be throttled to approx. 10% of the nominal rate. In addition, water can be introduced without carbon according to equilibrium conditions. The air is then regulated to as low as possible a temperature in the afterburner 7 at which a complete oxidation of a reformate gas is still possible. As a result, the fuel cell system 1d cools down. As soon as the temperature of the reformer reaches a target temperature of approx. 200° C., a recirculation of the fuel cell exhaust gas which is carried out during the shutdown process is stopped and the recirculation path 14 is purged with fuel gas to clear water and carbon monoxide from the fuel cell system and oxidise these. This also prevents or at least minimises the formation of nickel oxide as well as the condensation of steam in the reformer 5. The afterburner 7 is then deactivated and the fuel cell system 1d is completely actively cooled with air or cooled naturally. This can protect the reformer against damage and the necessary reduction of the catalyst can be omitted or shortened the next time the fuel cell system 1d is put into operation. Small amounts of carbon which may hereby form can be tolerated since they are regenerated the next time the fuel cell system 1d is put into operation.

In addition to the embodiments described, the invention allows further design principles. In other words, the invention should not be considered to be limited to the exemplary embodiments explained with reference to the drawings.

LIST OF REFERENCE SIGNS 1a-1d fuel cell system
2 fuel cell stack
3 anode portion
4 cathode portion
5 reformer
6 heating device
7 afterburner
8 anode gas supply line
9 fluid delivery device
10 steam supply line
11 exhaust gas heat exchanger
12 cathode gas heat exchanger
13 cathode gas supply line
14 recirculation path

The invention claimed is:

1. A method for heating a fuel cell system (1a; 1b; 1c; 1d) comprising at least one fuel cell stack (2) with an anode portion (3) and a cathode portion (4) as well as a reformer (5) upstream of the anode portion (3) for steam reforming using a fuel, the reformer (5) comprising a nickel-based catalyst, said method having the steps:
   starting a heating process for heating the fuel cell system (1a; 1b; 1c; 1d) with a heating device (6), and
   feeding a carbon-containing fluid in an anode gas supply line (8)
   upstream of a fluid delivery device (9) feeding steam from a steam supply line (10) into the anode gas supply line (8) for creating from the steam and the carbon-containing fluid a fuel/steam mixture in an anode gas supply line (8),
   conducting the fuel/steam mixture from the fluid delivery device (9), via the anode gas supply line (8), through the nickel-based catalyst of the reformer (5) during the heating process,
   wherein the fuel is used as carbon-containing fluid during the heating process in a fuel quantity of between 5% and 20% of the fuel quantity used during steam reforming in normal operation of the fuel cell system (1a; 1b; 1c; 1d).

2. The method according to claim 1, wherein the steam is conducted through the nickel-based catalyst as soon as a pre-definable threshold temperature in the fuel cell system (1a; 1b; 1c; 1d) is reached.

3. The method according to claim 1, wherein the fuel is methane, natural gas or LPG used as carbon-containing fluid.

4. The method according to claim 1, wherein the heating device (6) has a heat exchanger on the reformer (5) and an afterburner (7) for combusting cathode exhaust gas and/or anode exhaust gas from the at least one fuel cell stack (2), wherein afterburner exhaust gas is fed to a hot side of the heat exchanger downstream of the afterburner (7) in order to heat up the reformer (5) during the heating process.

5. The method according to claim 1, wherein a fluid delivery device (9) for delivering the fuel to the reformer (5) is arranged upstream of the reformer (5) in the anode gas supply line (8), wherein a hot side of an exhaust gas heat exchanger (11) is arranged in the steam supply line (10) and the steam is, during the heating process, conducted through the steam supply line (10) and the hot side of the exhaust gas heat exchanger (11), fed into the anode gas supply line (8) downstream or upstream of the fluid delivery device (9) and mixed with the fuel.

6. A fuel cell system (1a; 1b; 1c; 1d) which is designed to carry out a method according to claim 1, comprising at least one fuel cell stack (2) with an anode portion (3) and a cathode portion (4) as well as a reformer (5) upstream of the anode portion (3) for steam reforming a fuel, the reformer (5) comprising a nickel-based catalyst.

* * * * *